(12) United States Patent
Kaminski et al.

(10) Patent No.: US 7,508,101 B2
(45) Date of Patent: Mar. 24, 2009

(54) METHODS AND APPARATUS FOR USING AN ELECTRICAL MACHINE TO TRANSPORT FLUIDS THROUGH A PIPELINE

(75) Inventors: Christopher Anthony Kaminski, Niskayuna, NY (US); Blake Weldon Wilson, Glenville, NY (US); James Michael Fogarty, Schenectady, NY (US); Emil Donald Jarczynski, Scotia, NY (US); William Dwight Gerstler, Niskayuna, NY (US); John Russell Yagielski, Schenectady, NY (US); Konrad Roman Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 11/361,894

(22) Filed: Feb. 24, 2006

(65) Prior Publication Data

US 2007/0200438 A1    Aug. 30, 2007

(51) Int. Cl.
*H02K 9/10* (2006.01)
*H02K 9/19* (2006.01)
(52) U.S. Cl. .................... 310/54; 417/368
(58) Field of Classification Search ............ 310/52, 310/54; 417/366, 368, 423.5, 424.1
See application file for complete search history.

(56) References Cited

U.S. PATENT DOCUMENTS

| | | | |
|---|---|---|---|
| 3,863,083 A * | 1/1975 | Jaeschke | 310/52 |
| 3,960,468 A | 6/1976 | Boorse et al. | |
| 5,055,006 A | 10/1991 | Kobayashi et al. | |
| 5,091,666 A | 2/1992 | Jarczynski | |
| 5,209,650 A | 5/1993 | Lemieux | |
| 5,226,294 A * | 7/1993 | Mayer | 62/323.1 |
| 5,407,331 A | 4/1995 | Atsumi | |
| 6,034,465 A | 3/2000 | McKee et al. | |
| 6,100,618 A | 8/2000 | Schoeb et al. | |

(Continued)

FOREIGN PATENT DOCUMENTS

EP        1 482 179 B1        12/2006

(Continued)

OTHER PUBLICATIONS

Int'l Search Report, Feb. 4, 2004.

*Primary Examiner*—James Harvey
(74) *Attorney, Agent, or Firm*—Armstrong Teasdale LLP

(57) ABSTRACT

An electrical machine to facilitate transporting fluids through a pipeline is provided. The machine includes a stator, a rotor magnetically coupled to the stator, and a housing enclosing the rotor and the stator. The housing includes a wall that facilitates channeling a first fluid at a first pressure through a portion of the housing. The machine also includes a stator enclosure defined by at least one wall that facilitates maintaining a second fluid within the stator enclosure. The stator enclosure is positioned within the electric machine housing. The stator enclosure has at least one wall that substantially isolates the second fluid from the first fluid such that only the second fluid is in flow communication with the stator. The stator enclosure has at least one wall that facilitates heat transfer from the second fluid to the first fluid. At least a portion of at least one of the stator enclosure walls is configured to facilitate equalizing the first pressure and the second pressure.

20 Claims, 4 Drawing Sheets

U.S. PATENT DOCUMENTS

| | | |
|---|---|---|
| 6,196,809 B1 | 3/2001 | Takahashi et al. |
| 6,203,294 B1 | 3/2001 | Turley et al. |
| 6,209,328 B1 | 4/2001 | Kim et al. |
| 6,488,486 B1 | 12/2002 | Debleser |
| 6,652,249 B2 | 11/2003 | Kenney et al. |
| 2004/0066099 A1* | 4/2004 | Weeber et al. ............ 310/58 |
| 2005/0019170 A1 | 1/2005 | Suter et al. |
| 2007/0200438 A1* | 8/2007 | Kaminski et al. ............ 310/54 |
| 2007/0236094 A1* | 10/2007 | Kaminski et al. ...... 310/156.28 |
| 2007/0278879 A1* | 12/2007 | Kaminski et al. ............ 310/86 |

FOREIGN PATENT DOCUMENTS

| | | |
|---|---|---|
| WO | WO 2004/036052 | 4/2004 |

\* cited by examiner

METHODS AND APPARATUS FOR USING AN ELECTRICAL MACHINE TO TRANSPORT FLUIDS THROUGH A PIPELINE

BACKGROUND OF THE INVENTION

This invention relates generally to fluid transport systems and, more particularly, to methods and apparatus for using an electrical machine to transport fluids through a pipeline.

Fluid transport is used in a variety of different industries including, but not limited to, the chemical, oil and gas industries. In one known fluid transport application fluids are transported from on-shore or off-shore locations to processing plants for subsequent use. In other known applications, fluid transport is used in hydrocarbon processing industries and chemical industries, and to facilitate distribution to end-users.

At least some known fluid transport stations use fluid transport apparatus such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. Electrical machines (i.e., electrically-powered drive motors, or electric drives) may be advantageous over mechanical drives (i.e., gas turbines) in operational flexibility (variable speed for example), maintainability, lower capital cost and lower operational cost, better efficiency and environmental compatibility. Additionally, electric drives are generally simpler in construction than mechanical drives, generally require a smaller foot print, may be easier to integrate with the fluid transport apparatus, may eliminate the need for a gearbox, and/or may be more reliable than mechanical drives.

However, systems using electric drives may be less efficient than those systems using mechanical drives. At least some factors affecting electric drive efficiency include electrical and electronic topologies of motor drive and drive controls electrical power source quality and efficiency, size and weight of electric drive components (stators for example) and magnetic coupling strength. Moreover, fluid transport apparatus electric drives generate heat via the drive components, within the stators for example, and may require supplemental systems to facilitate heat removal. For example, some known electric drives use the fluid being transported as the primary heat tansfer medium and channel the fluid through and around the stator. However, in some cases, the fluid being transported may have aggressive constituents or impurities which may adversely affect the efficiency of the components being used.

BRIEF DESCRIPTION OF THE INVENTION

In one aspect, an electrical machine is provided. The machine includes a stator, a rotor magnetically coupled to the stator, and a housing enclosing the rotor and the stator. The housing includes a wall that facilitates channeling a first fluid at a first pressure through a portion of the housing. The machine also includes a stator enclosure defined by at least one wall that facilitates maintaining a second fluid within the stator enclosure. The stator enclosure is positioned within the electric machine housing. The stator enclosure has at least one wall that substantially isolates the second fluid from the first fluid such that only the second fluid is in flow communication with the stator. The stator enclosure has at least one wall that facilitates heat transfer from the second fluid to the first fluid. At least a portion of at least one of the stator enclosure walls is configured to facilitate equalizing the first pressure and the second pressure.

In another aspect, a method of operating an electrical machine is provided. The method includes coupling a transport station including a fluid transport assembly powered by the electrical machine to a source of a first fluid. The assembly and the machine are enclosed within a housing. The method also includes channeling the first fluid from the fluid transport assembly to the electrical machine such that the first fluid flows over at least a portion of a stator enclosure defined in the housing. The method further includes transferring heat generated within the stator enclosure to the first fluid such that an operating temperature of a second fluid within the stator enclosure is facilitated to be reduced. The method also includes discharging the first fluid from the housing.

In a further aspect, a fluid transport station is provided. The station includes a unitary housing including at least one wall. The wall facilitates channeling a first fluid within the unitary housing. The station also includes a fluid transport assembly within the unitary housing. The fluid transport assembly includes at least one rotatable shaft. The station further includes a drive motor positioned within the housing. The drive motor includes a stator with an enclosure and a rotor. The stator enclosure and the rotor are enclosed within the housing. The rotor is magnetically coupled to the stator and the drive motor rotor is rotatably coupled to the fluid transport assembly rotatable shaft. The stator enclosure is defined by at least one wall that facilitates maintaining a second fluid within the stator enclosure. The stator enclosure wall substantially isolates the second fluid from the first fluid such that only the second fluid is in flow communication with the stator. The stator enclosure wall facilitates heat transfer from the second fluid to the first fluid. At least a portion of at least one of the stator enclosure walls is configured to facilitate equalizing the first pressure and the second pressure.

DETAILED DESCRIPTION OF THE INVENTION

Figure 1:
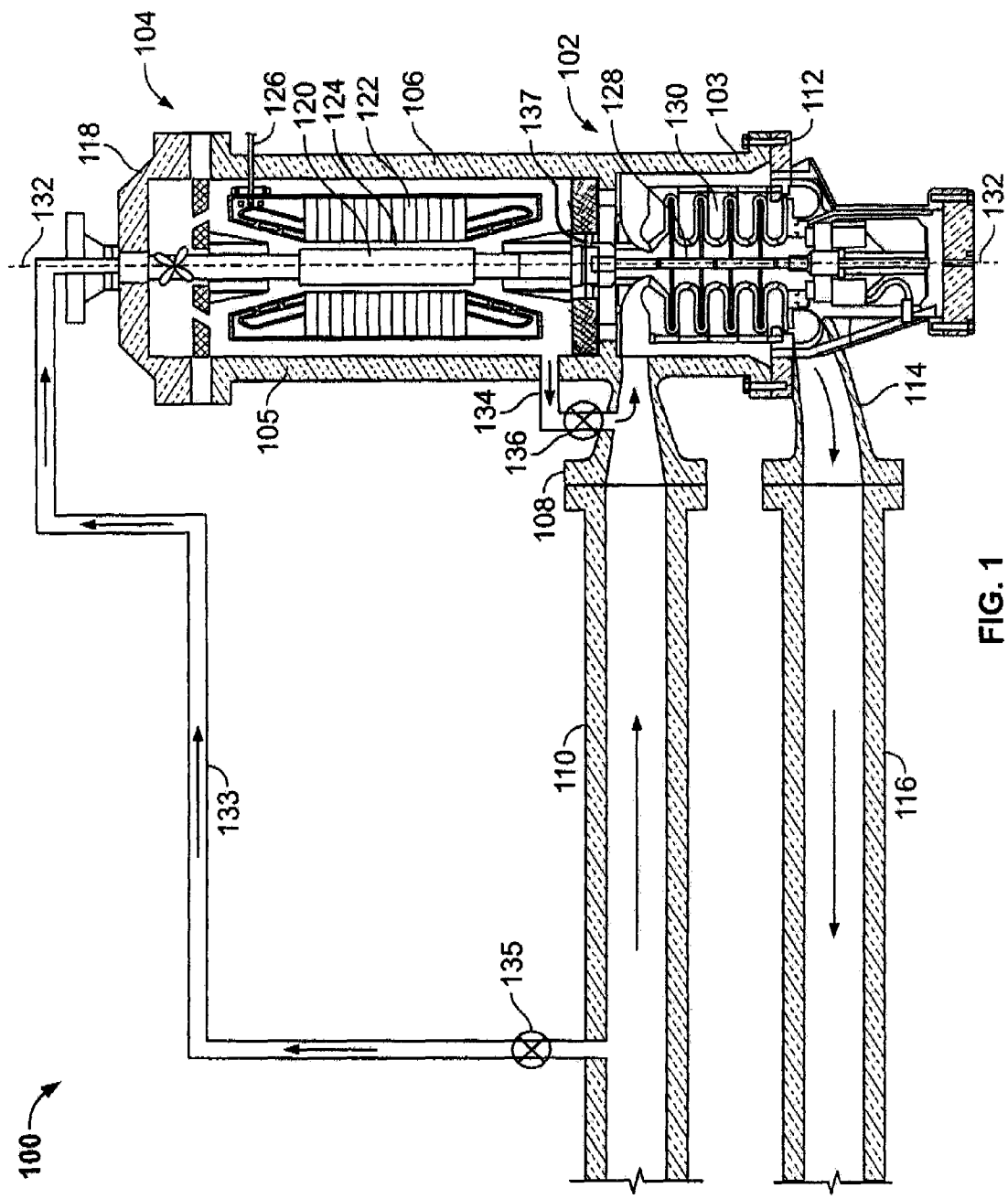
FIG. 1 is a cross-sectional schematic view of an exemplary fluid transport station.

FIG. 1 is a cross-sectional schematic view of an exemplary fluid transport station 100. In the exemplary embodiment, station 100 is a submerged natural gas compressing station 100 that includes a fluid transport assembly 102. In the exemplary embodiment, assembly 102 is a multi-stage compressor 102 that is rotatingly coupled to an electric drive motor 104. Alternatively, assembly 102 may be, but is not limited to being a pump or a fan. Station 100 may be positioned in any geographical location and may facilitate transport of any fluid wherein predetermined operational parameters are attained. Examples of fluids that may be transported by station 100 include, but are not limited to untreated methane channeled to station 100 from a natural source (not shown in FIG.1).

In the exemplary embodiment, motor 104 is a permanent magnet-type electric motor 104 designed for operating speeds above the maximum speed of 3600 revolutions per minute typically associated with synchronous motors powered by a 60 Hz electrical power source. Therefore, motor 104 is enerall referred to as a "super-synchronous" motor. More specifically, in the exemplary embodiment, motor 104 includes a variety of features that may be advantageous over alternative drive mechanisms. For example, in the exemplary embodiment, motor 104 may attain speeds in a range of approximately 8,000 to 20,000 revolutions per minute (rpm) without using additional components, for example, gearboxes to facilitate increasing output speed. Alternately, motor 104 speeds in excess of 20,000 rpm may be used. The increased speeds facilitate a rapid pressurization of the gas, thus increasing the efficiency and effectiveness of compressing station 100. Additionally, in this embodiment, the elimination of additional components, for example, gearboxes, results in station 100 requiring a smaller foot print and the elimination of the associated maintenance. Another feature of this embodiment is the elimination of wearable components, such as carbon-based slip rings. As a result, in the exemplary embodiment, the reliability of the compressing station 100 is facilitated to be increased with motor 104. Alternatively, motor 104 may be a permanent magnet-type synchronous motor, a separately excited motor, an induction motor, or any other drive device that attains predetermined operational parameters and that enables station 100 to function as described herein.

Motor 104 and compressor 102 are fixedly secured within a one-piece (i.e., unitary) housing 106. Motor 104 is positioned within a motor portion105 of housing 106 and compressor 102 is positioned within a compressor portion 103 of housing 106. In the exemplary embodiment, housing 106 is fabricated via a casting or forging process. Alternatively, housing 106 may be fabricated using any method known in the art, for example, a welding process that enables housing 106 to be assembled to form a unitary housing 106 that functions as described herein. Housing 106 includes a compressor suction fixture 108 that is coupled in flow communication to an inlet pipeline 110. Pipeline 110 may be fabricated of metal, rubber, polyvinylchloride (PVC), or any material that attains predetermined operational parameters associated with the fluid being transported and the location of station 100.

In the exemplary embodiment, station 100 also includes a compressor end piece 112, that is coupled to and extends outward from housing 106. End piece 112 facilitates enclosing compressor 102 within station 100 subsequent to insertion of compressor 102 into housing 106 and includes a compressor discharge fixture 114 that is coupled in flow communication to a compressor outlet pipeline 116 that is substantially similar to inlet pipeline 110. In addition, a motor end cover assembly 118 is fixedly coupled to housing 106. End cover 118 facilitates enclosing motor 104 within station 100 subsequent to insertion of motor 104 into housing 106.

Motor 104 includes a rotor 120 fabricated from magnetically conductive materials, a plurality of permanent magnets (not shown in FIG. 1) that are coupled to rotor 120, and a stator 122 that are positioned such that a gap 124 is defined between stator 122 and rotor 120. A plurality of power supply cables positioned within electric cable conduit 126 facilitate coupling station 100 to a power source, for example, a variable frequency drive (VFD) (not shown in FIG. 1). The permanent magnets induce a magnetic field (not shown in FIG. 1) around rotor 120. When stator 122 is powered, an electromagnetic field is induced within motor 104. Gap 124 facilitates magnetic coupling of rotor 120 and stator 122 to generate a torque that induces rotation in rotor 120.

Compresor 102 includes a rotatable drive shaft 128 that is rotatably coupled to rotor 120. In the exemplary embodiment, compressor 102 includes a plurality of compressor stages 130. Alternatively, compressor 102 may include only one stage. Rotor 120 and shaft 128 are rotatable about an axis of rotation 132. Axis of rotation 132 may be in any orientation that facilitates attaining predetermined operational parameters of station 100 that includes, but is not limited to, horizontal and vertical orientations.

During operation, the VFD supplies multi-phase alternating current to stator 122 at pre-determined voltages and frequencies. A rotating electromagnetic field (not shown in FIG. 1) is generated in stator 122. At any given speed a relative strength of the magnetic field generated is proportional to the voltage supplied by the VFD. As the electromagnetic field induced in stator 122 rotates, the magnetic field of rotor 120 interacts with the electromagnetic field of stator 122 through gap 124. The interaction of the two magnetic fields induces torque, and subsequently, rotation of rotor 120.

Station 100 receives natural gas via inlet pipeline 110 at a first predetermined pressure. The gas is channeled to compressor 102 via suction fixture 108. Gas subsequently flows into compressor 102 and is compressed to a greater density and smaller volume at a second predetermined pressure that is greater than the first predetermined pressure. The compressed gas is discharged to outlet pipeline 116 via discharge fixture 114.

In the exemplary embodiment, station 100 includes a motor transport fluid supply pipe 133 and a motor transport fluid return pipe 134. Supply pipe 133 is coupled in flow communication with inlet pipeline 110 and motor end cover 118. Return pipe 134 is coupled in flow communication with motor portion 105 of housing 106 and suction fixture 108. Pipes 133 and 134 may be fabricated of metal, rubber, polyvinylchloride (PVC), or any material that attains predetermined operational parameters associated with the fluid being transported and the location of station 100. Pipes 133 and 134 are sized to facilitate initial filling of, and subsequently facilitate maintaining fluid pressure within housing portion 105 at a pressure substantially similar to the fluid pressure within inlet fixture 108.

Supply pipe 133 includes a motor supply valve 135 and return pipe 134 includes a motor return check valve 136. Check valve 136 facilitates mitigating channeling transport fluid from fixture 108 to pipe 134 and subsequently into housing portion 105. In the exemplary embodiment, valve 135 is a throttling-type valve that is adjusted to predetermined open positions to facilitate channeling a predetermined flow of transport fluid through motor 104 as well as a predetermined rate of pressurization of housing portion 105. Valve 135 may be, but not be limited to a needle valve. Alternatively, valve 135 may be an isolation-type valve that may include, but not be limited to, a gate valve wherein a predetermined fluid flow rate and a predetermined rate of pressurization are facilitated with devices that may include, but not be limited to at least one flow orifice (not shown in FIG. 1). System 100 further includes a motor-compressor housing seal 137 that facilitates mitigating flow communication between motor portion 105 of housing 106 and compressor portion 103 of housing 106.

In operation, a portion of transport fluid is channeled from inlet pipeline 110 towards motor end cover 118 as the associated arrows illustrate. The transport fluid is channeled through motor 104 (as described in detail below) and subsequently channeled to suction fixture 108 via return pipe 134.

Figure 2:
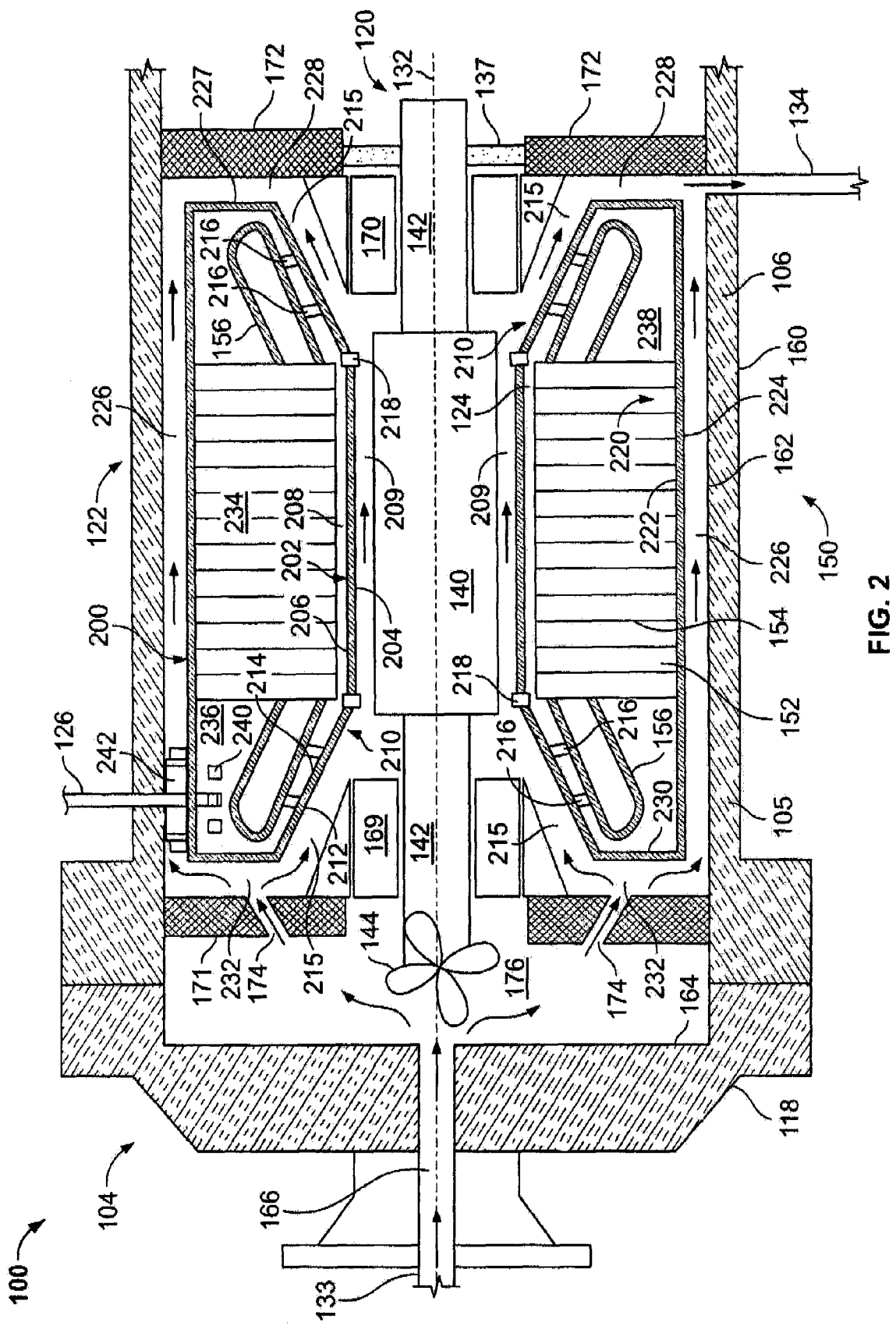
FIG. 2 is a cross-sectional schematic view of an exemplary electric motor that may be used with the fluid transport station shown in FIG. 1.

FIG. 2 is a cross-sectional schematic view of exemplary motor 104 that may be used with fluid transport station 100 (shown in FIG. 1). As described above, motor 104 includes an end cover assembly 118, rotor 120, stator 122, gap 124, electric cable conduit 126, axis 132 and seal 137. Housing 106 encloses motor 104 within housing portion 105.

Rotor 120 includes a permanent magnet portion 140. A plurality of permanent magnets (not shown in FIG. 2) is encased within the periphery of portion 140. Rotor 120 also includes a spindle portion 142. Section 140 is coupled to spindle portion 142 such that at least a portion of spindle 142 extends from each axial end of portion 140. Also, portion 140 is coupled to spindle portion 142 such that rotational forces induced within portion 140 induce rotation in portion 140 as well as portion 142. An internal fluid transport apparatus 144 is rotatably coupled to a portion of spindle 142. In the exemplary embodiment, apparatus 144 is a fan 144 coupled to an outboard-most portion of spindle 142. Fan 144 is dimensioned and positioned to facilitate fluid flow within housing portion 105. Alternatively, apparatus 144 may include, but not be limited to a pump or any device that attains predetermined parameters associated with the fluid being transported within housing portion 105. Also, alternatively, apparatus 144 may be positioned within housing portion 105 wherever predetermined operational parameters are attained.

Stator 122 includes a substantially toroidal stator core portion 150. Core portion 150 is positioned within housing portion 105 such that rotor permanent magnet portion 140 and stator core portion 150 define annular gap 124. Core 150 includes a plurality of electromagnetically conductive laminations 152 and a plurality of thermally conductive laminations 154. Thermally conductive laminations 154 have heat transfer properties that facilitate heat removal from core portion 150 (discussed below in more detail) more efficiently and effectively than laminations 152. In the exemplary embodiment, thermally conductive laminations 154 have copper or copper alloy as the primary constituent. Alternatively, laminations 154 may include any number and any percentage of constituents that attain predetermined parameters that facilitate operation of motor 104. Laminations 154 and 152 are interspersed within core portion 150 such that predetermined parameters for heat removal from core portion 150 and for magnetic coupling of stator 122 with rotor 120 across gap 124 are attained. Stator 122 also includes an armature winding, the end windings of which, or end turn, portions 156 are illustrated. Portions 156 are electrically coupled to and extend axially outward from core portion 150. Each portion 156 is positioned on axially opposing ends of stator core portion 150.

Housing 106 includes a peripheral surface 160 and a radially inner surface 162. In the exemplary embodiment, housing 106 and peripheral surface 160 are substantially cylindrical and surface 162 is substantially annular. Alternatively, housing 106 and its associated components may be of any shape and/or configuration that attain predetermined operating parameters. Also, in the exemplary embodiment, the radial distance between surfaces 160 and 162, i.e., the thickness of housing 106, and the materials of fabrication of housing 106 are sufficient to facilitate tolerating operating parameters such as, but not being limited to external operating pressures and temperatures associated with the depth and body of water in which station 100 is submerged as well as the properties of the fluid being transported.

End cover assembly 118 includes a radially circumferential surface 164 and a fluid supply passage 166 defined within assembly 118 that is coupled in flow communication with supply pipe 133. Fluid supply passage 166 is sized to facilitate initial filling of, and subsequently facilitate maintaining fluid pressure within housing portion 105 at a pressure substantially similar to the fluid pressure within inlet fixture 108 (shown in FIG. 1). Passage 166 also facilitates controlling a rate of pressurization of housing portion 105 to a predetermined rate.

Motor 104 further includes an out board magnetic bearing 169 and an inboard magnetic bearing 170 as well as an outboard bearing support member 171 and an inboard bearing support member 172. In the exemplary embodiment, members 171 and 172 are substantially annular and are fixedly secured to housing radially inner surface 162 and project radially inward toward rotor 120 from surface 162. Member 171 has at least one open passage 174 formed within member 171 to facilitate fluid flow within housing portion 105 as described further below. Alternatively, members 171 and 172 may be, but not be limited to a plurality of radially extending members shaped, configured and dimensionally positioned to support bearings 170 and facilitate fluid flow within housing portion 105 as described further below. Wall 162 and surface 164, a portion of surface 162, bearings 169 and bearing support member 171 define a fluid inlet plenum 176 that is coupled in flow communication with fan 144, and passages 166 and 174 and facilitates channeling fluid to fan 144.

Magnetic bearings 169 and 170 facilitate radial positioning of rotor 120. In the exemplary embodiment, magnetic bearings 169 and 170 are configured to be an active-type of magnetic bearing. More specifically, a control sub-system (not shown in FIG. 2) is used in conjunction with magnetic bearings 169 and 170 to determine the radial position of the rotational bearing component (not shown in FIG. 2) relative to the fixed component (not shown in FIG. 2) at any given time and facilitate magnetic adjustments to correct any deviations at any given angular position. Magnetic bearings 169 and 170 facilitate operation of rotor 120 at the aforementioned high speeds associated with exemplary motor 104. Alternately, non-magnetic bearings that may include, but not be limited to journal bearings, for example, that attain predetermined parameters, that include, but are not limited to mitigating vibration and friction losses may be used. At least one rundown bearing (not shown in FIG. 2) may be positioned within motor 104 in a manner similar to bearing 169 and 170 to facilitate radial support to rotor 120 in event of magnetic bearings 169 and/or 170 failure. Furthermore, at least one thrust bearing (not shown in FIG. 2) may be positioned within motor 104 in a manner similar to bearings 169 and 170 to facilitate mitigating the effects of axial thrust of rotor 120 and shaft 128 (shown in FIG. 1).

Figure 3:
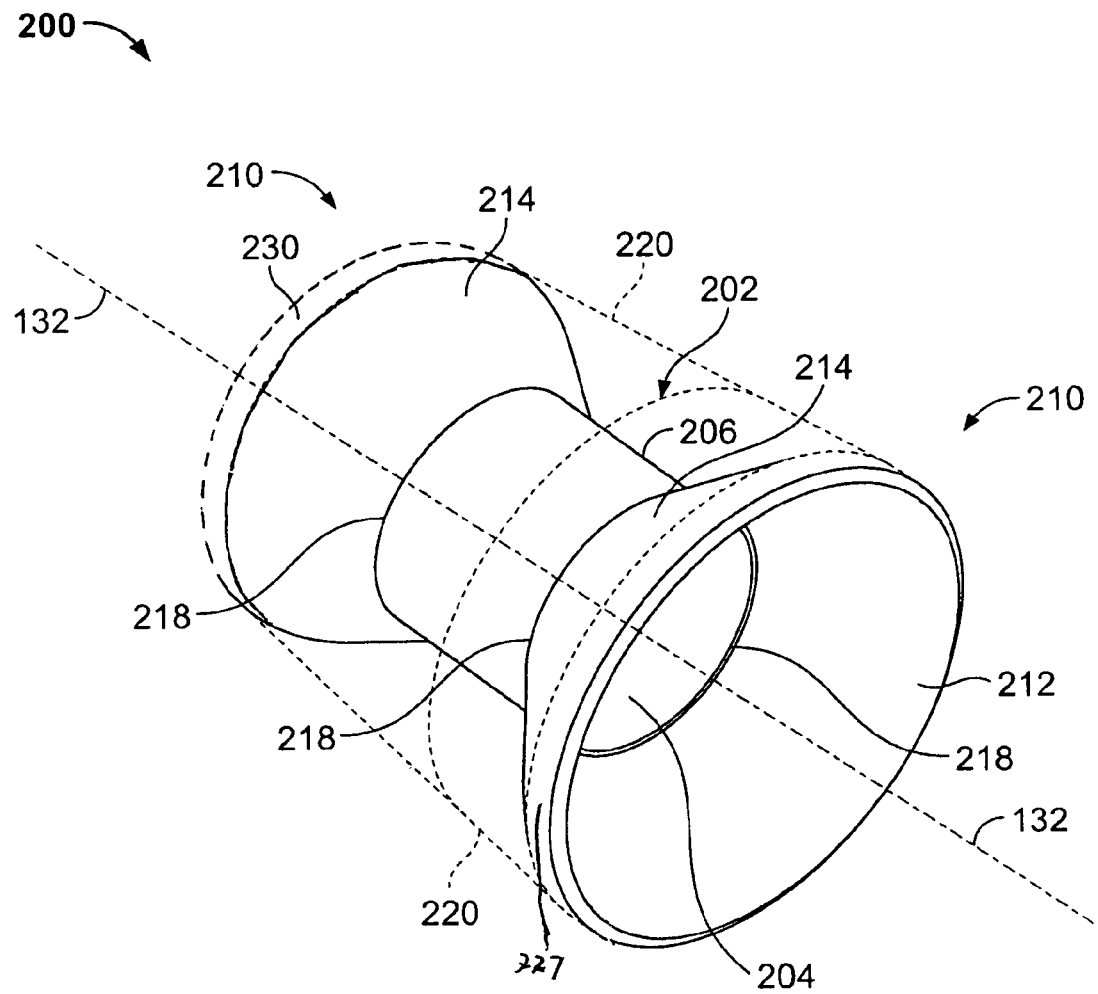
FIG. 3 is a skewed axial schematic view of a portion of an exemplary stator enclosure that may be used with the electric motor shown in FIG. 2.

In the exemplary embodiment, stator 150 is housed in a stator enclosure 200. FIG. 3 is a skewed axial schematic view of a portion of exemplary stator enclosure 200 that may be used with electric motor 104 (shown in FIG. 2). FIG. 3 is referenced in conjunction with FIG. 2 for a discussion of enclosure 200. Rotor 104 axis of rotation 132 is illustrated in FIG. 3 for perspective.

Station 100 may be employed in transporting fluids with aggressive properties and/or impurities. These fluids may be introduced into housing portion 105 for purposes of lubrication and/or cooling of motor 104 components. Enclosure 200 substantially isolates stator 122 from fluids circulated within housing portion 105.

Enclosure 200 includes a substantially annular cylindrical portion 202 that is radially positioned within gap 124. Cylindrical portion 202 includes a radially inner surface 204 and a radially outer surface 206. Radially outer surface 206 and a radially innermost portion of stator core 150 define a substantially annular stator enclosure passage 208 (described in more detail below). Radially inner surface 204 and the periphery of rotor portion 140 define a substantially annular radially inner passage 209 (described in more detail below). Parameters associated with the materials used to fabricate portion 202 include, but are not limited to having electrically non-conductive properties, magnetically neutral properties, and having sufficient strength and corrosion resistance to mitigate portion 202 distortion and corrosion during operation and may also include properties that facilitate conductive heat transfer. Portion 202 may be fabricated from materials that include, but are not limited to alumina-based ceramic composites.

Enclosure 200 also includes two conical portions 210 that are coupled to and extend radially and axially from cylindrical portion 202. Portions 210 are positioned between magnetic bearings 170 and end turns 156 and have a radially inner surface 212 and a radially outer surface 214. Surfaces 212 and a radially outer surface of bearings 170 define a plurality of passages 215 in a substantially annular region that are coupled in flow communication with passage 209. Parameters associated with the materials used to fabricate portion 210 include, but are not limited to having sufficient strength and corrosion resistance to mitigate portion 202 distortion and corrosion during operation and may also include properties that facilitate conductive heat transfer. Portion 210 may be fabricated from materials that include, but are not limited to stainless steel.

In the exemplary embodiment, a plurality of end turn support members 216 are secured to conical portions radially outer surface 214 such that radial and axial support of stator end turns 156 are facilitated. Alternatively, any number of members 216 including, but not being limited to none, may be used. Members 216 may be fabricated of any materials that have properties that include, but are not limited to those that facilitate material and operational compatibility with surface 214 and end turn 156 material properties as well as facilitate attaining predetermined operational parameters associated with motor 104.

In the exemplary embodiment, a first of two portions 210 and portion 202 are fabricated of similar materials that are joined at their interfaces using methods that may include, but are: not limited to welding or brazing the first portion 210 to portion 202, or casting the first portion 210 and portion 202 as a unitary portion (not shown in FIGS. 2 and 3). Subsequently, a second portion 210 that is fabricated of a material different from the first portion 210 and portion 202 is coupled to portion 202 on an axially opposing side from the first portion 210. A substantially toroidal seal 218 is secured to the interface of portion 202 and the second portion 210 such that isolation of stator 122 from fluids transported within housing 106 is facilitated. Seal 218 may be fabricated of any materials that have properties that include, but are not limited to those that facilitate material and operational compatibility with portions 202 and 210 material properties as well as facilitate attaining predetermined operational parameters associated with motor 104.

Alternatively, both portions 210 may be fabricated from materials different from portion 202 materials. In this alternative embodiment, a plurality of substantially toroidal seals 218 are secured to the interfaces of portions 202 and 210. Further, alternatively, portions 202 and both portions 210 may be fabricated of similar materials that may be joined at their interfaces using methods as described above.

Enclosure 200 further includes a substantially cylindrical radially outer wall 220 that includes a radially inner surface 222 and a radially outer surface 224. Surfaces 224 and 162 define a substantially annular radially outer passage 226 (described in more detail below). Parameters associated with the materials used to fabricate wall 220 include, but are not limited to having sufficient heat transfer properties to facilitate conductive heat transfer, and having sufficient strength and corrosion resistance to mitigate wall 220 distortion and corrosion during operation. Surface 222 is positioned in conductive thermal communication with thermally conductive laminations 154.

Enclosure 200 also includes a substantially toroidal pressure responsive wall 227 that facilitates mitigating pressure differences between enclosure 200 and the remainder of housing portion 105. Wall 227 extends between wall 220 and at least one of portions 210. Wall 227 and bearing support member 172 define a substantially annular fluid passage 228 that is coupled in flow communication with passages 226 and 215 as well as outlet pipe 134. Properties associated with the materials used to fabricate wall 227 include, but are not limited to having sufficient strength and corrosion resistance to mitigate wall 227 distortion and corrosion during operation as well as sufficient flexibility to facilitate pressure equalization as described above during dynamic conditions may also include properties that facilitate conductive heat transfer. Wall 227 may be fabricated from materials that include, but are not limited to alumina-based ceramic composites.

Enclosure 200 further includes a substantially toroidal access plate 230 that facilitates attaining access to stator 122 subsequent to stator 122 positioning within enclosure 200 and housing 106. Plate 230 extends between and is removably coupled to wall 220 and at least one of portions 210 and is positioned opposite wall 227. Plate 230 and bearing support member 172 define a passage 232 that is coupled in flow communication with passages 174, 226 and 215. Parameters associated with the materials used to fabricate wall 220 include, but are not limited to having sufficient strength and corrosion resistance to mitigate plate 230 distortion and corrosion during operation and may also include properties that facilitate conductive heat transfer. Plate 230 may be fabricated from materials that include, but are not limited to stainless steel.

Enclosure 200 may be further described as a plurality of portions. A substantially annular core portion 234 of enclosure 200 is defined between cylindrical portion 202 and a portion of radially inner surface 222 and houses stator core portion 150. An axially upstream end turn portion 236 is defined between a portion of radially inner surface 222, plate 230, a circumferential portion of stator core 150 and one of conical portions 210 and houses one of stator end turn portions 156. An axially downstream end turn portion 238 is defined between a portion of radially inner surface 222, wall 227, a circumferential portion of stator core 150 and one of conical portions 210 and houses one of stator end turn portions 156.

In the exemplary embodiment, enclosure 200 includes cylindrical portion 202, conical portions 210 and cylindrical wall 220. Alternatively, portions 202 and 210 as well as 220 may be a combination of any geometrical configurations that facilitate attaining predetermined operational parameters associated with motor 104 and station 100.

Enclosure 200 is supported within housing 106 via a plurality of enclosure 200 support members (not shown in FIGS. 2 and 3) secured to surfaces 162 and 224. Enclosure 200 support members are positioned and distributed such that radial and axial movement of enclosure 200 are mitigated. The enclosure 200 support members may be fabricated of any materials that have properties that include, but are not limited to those that facilitate material and operational compatibility with surfaces 162 and 224 material properties as well as facilitate attaining predetermined operational parameters associated with motor 104.

In the exemplary embodiment, enclosure 200 is filled with a dielectric fluid, for example, but not being limited to transformer oil. The dielectric fluid has properties that include, but are not limited to facilitating convective and conductive heat transfer and mitigating potential for electrical arc discharges within enclosure 200.

Motor 104 further includes a plurality of electrical terminals 240 positioned within enclosure portion 236. In the exemplary embodiment, three terminals 240 are each configured to receive one of a plurality of three-phase electrical cables (not shown in FIG. 2) enclosed within conduit 126. Alternatively, six or more terminals 240 may be used. Electrical conduit 126 containing the electrical cables is routed to terminals 240 via penetrations formed within housing 106 and wall 220. A conduit enclosure 242 is secured to and between surface 162 and surface 224 to facilitate routing conduit 126 such that isolation of conduit 126 from the fluid in housing 106 is facilitated. Enclosure 242 may be fabricated of any materials that have properties that include, but are not limited to those that facilitate material and operational compatibility with surfaces 162 and 224 material properties as well as facilitate attaining predetermined operational parameters associated with motor 104. Enclosure 242 may be filled with a fluid substantially similar to that used within enclosure 200.

In operation, the fluid being transported by compressor 102 is also used to facilitate cooling of motor 104 as illustrated with arrows in FIG. 2. Prior to electrically powering stator 122 and starting motor 104, as discussed above, housing portion 105 is filled with transport fluid and attains a pressure substantially similar to that of inlet pipeline 110 and suction fixture 108 (both shown in FIG. 1) since it is coupled in flow communication with pipeline 110 and fixture 108. Pipes 133 and 134, plenum 176, and passages 166, 174, 232, 226, 215, 209, and 228 are filled with transport fluid and are in substantial pressure equilibrium. Once motor 104 is powered and rotor 120 is rotating, fan 144 forms a low pressure region locally in the vicinity of the region wherein passage 166 couples in flow communication with inlet plenum 176 and also forms a local high pressure region within plenum 176. Transport fluid is channeled from passage 166 and is channeled into passage 174 that is coupled in flow communication with plenum 176. Transport fluid is then channeled into passage 232.

Enclosure 200 is filled with dielectric fluid. During operation of motor 104, wherein stator 122 is electrically powered, heat losses within stator core portion 154 and stator end turn portions 156 typically increase the temperature of the associated components. Heat losses within portions 156 are substantially conductively transferred to the dielectric fluid. Convective fluid flow within enclosure portions 238 is induced by the difference in dielectric fluid temperatures between dielectric fluid in contact with stator end turn portions 156 and dielectric fluid not in contact with portions 156. Heat is subsequently transferred to walls 230 and 227 as well as portions of wall 220, and also transferred to cylindrical portion surface 206 and conical portions surfaces 214. Minute differences in heat transfer properties between enclosure portions 236 and 238 may tend to induce small pressure differences between portions 236 and 238. These pressure differences, which may induce subsequent pressure imbalances between the dielectric fluid and the transport fluid via pressure responsive wall 227, are mitigated by passage 208 that is coupled in flow communication with portions 236 and 238. Heat losses generated within core portion 154 are substantially collected and channeled to wall 220 via conductive heat transfer of laminations 154.

A portion of the transport fluid within passage 232 is channeled into passage 226 wherein the transport fluid removes heat from surface 224. The fluid is then channeled into passage 228. A portion of the transport fluid within passage 232 is also channeled into passage 215 wherein the transport fluid being coupled in flow and thermally conductive communication with surface 212 removes heat from wall 210. A similar action occurs as the transport fluid is channeled through passage 209 and removes heat from portion 202 via surface 206 and further channeled into passage 215 and removes heat from portion 210 via surface 212. The transport fluid from passage 215 is subsequently channeled into passage 228 wherein it mixes with the fluid channeled from passage 226. Heat is transferred to the fluid via wall 227 and then channeled into outlet pipe 134.

The transport fluid channeled into outlet pipe 134 from passage 228 has a predetermined heat energy collected from the transport fluid travel through motor 104 as well as a predetermined temperature. The environment surrounding housing 106 typically has a lower temperature than the environment within housing portion 105. Therefore, surface 160 is typically cooler than surface 162. As a portion of transport fluid is channeled through passage 226, a portion of the heat energy within the associated fluid may conductively transfer to housing 106 which subsequently transfers heat energy to the environment immediately surrounding housing surface 160. Furthermore, the transport fluid within fixture 108 typically has a lower temperature than the transport fluid channeled from housing portion 105 via pipe 134. The portion of transport fluid from motor 104 is channeled into the larger volume of transport fluid entering compressor 102 via fixture 108. The mixing of the fluid streams within fixture 108 and compressor 102 and the subsequent channeling of transport fluid into outlet pipeline 116 facilitate heat removal from station 100.

Station 100 may be positioned in environments wherein external pressures on surface 160 are substantially different from those within housing 106. Housing 106 facilitates mitigation of pressure imbalances within housing 106 due to high pressures or large pressure changes external to housing 106.

Station 10o may also experience changes in pressures of transport fluid within inlet pipeline 110 and suction fixture 108. Housing 106 portion enclosing motor 104 being coupled in flow communication with suction fixture 108 may also be subject to high pressures and large pressure transients. Mitigation of changes in pressure within housing 106 are facilitated by the passage between housing 106 and fixture 108 as well as pressure responsive wall 227. As pressure within housing 106 increases, wall 227 flexes inward within stator enclosure portion 238, thereby decreasing the volume of enclosure 200 and increasing the volume of housing 106, and subsequently decreasing housing pressure and increasing enclosure 200 pressure until the two pressures are substantially equalized. Alternatively, as the pressure within enclosure 200 exceeds housing 106 pressure (either due to pressure decreases in fixture 108 or pressure increases within enclosure 200), wall 227 flexes outward within housing 106 thereby increasing the volume of enclosure 200 and decreasing the volume of housing 106, and subsequently increasing housing pressure and decreasing enclosure 200 pressure until the two pressures are substantially equalized.

Figure 4:
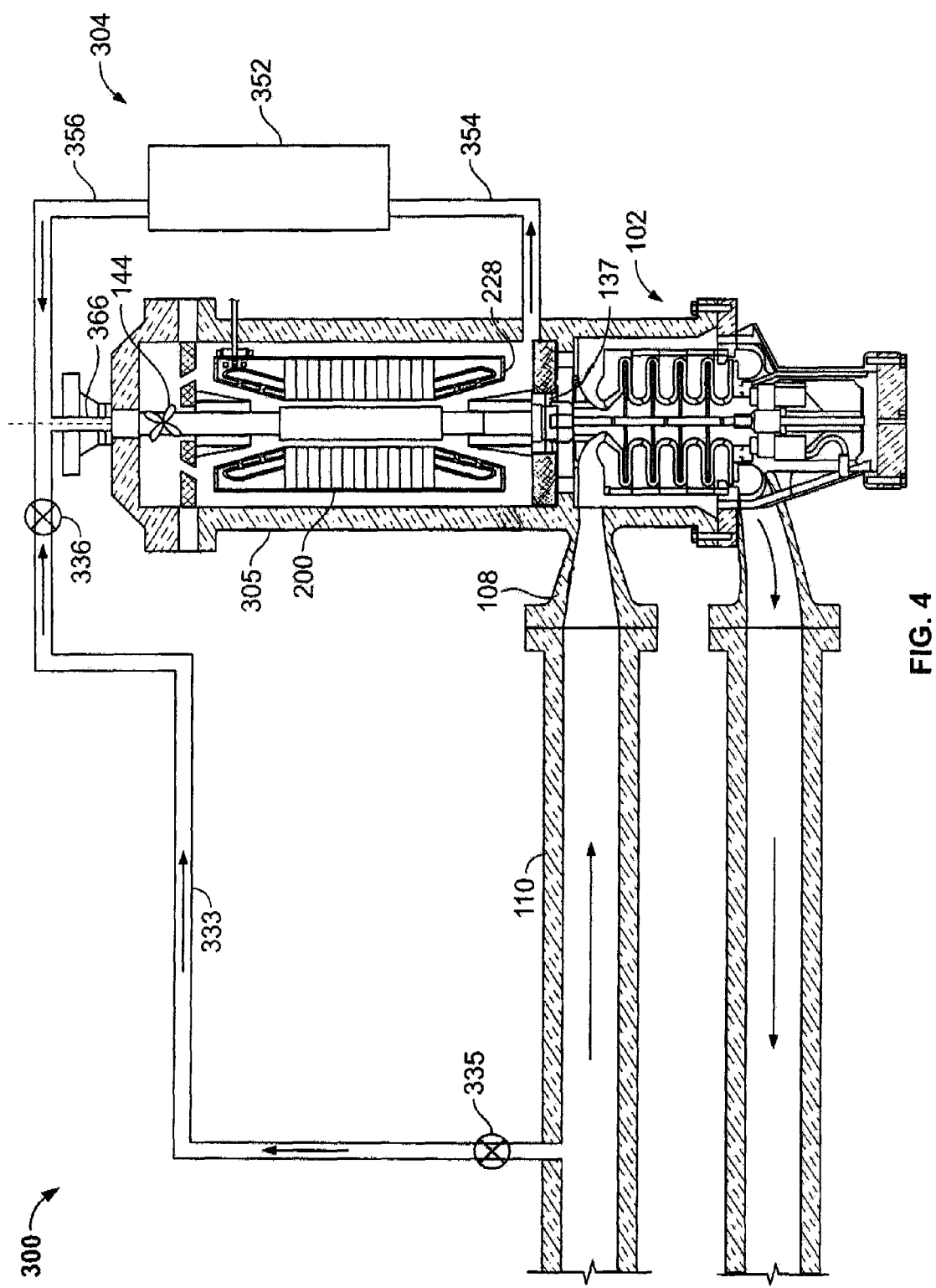
FIG. 4 is a cross-sectional schematic view of an alternative electric motor that may be used with an alternative fluid transport station.

FIG. 4 is a cross-sectional schematic view of an alternative electric motor 350 that may be used with an alternative fluid transport station 300 (shown in FIG. 1). Station 300 is substantially similar to station 100 with the exceptions that pipes 133 and 135, (shown in FIGS. 1 and 2), valves 134 and 136 (shown in FIG. 1) and passage 166 (shown in FIG. 2) are supplanted by pipe 333, and valves 335 and 336. Pipe 333 is substantially similar to pipe 133 with the exception that pipe 333 includes a check valve 336 that is substantially similar to check valve 136. Valve 335 is substantially similar to valve 135. Valve 335 may be an isolation-type valve, and to facilitate maintaining a predetermined rate of fluid flow and a predetermined rate of pressurization of motor 304, a flow control apparatus that may include, but not be limited to a flow orifice (not shown in FIG. 4) may be positioned within pipe 333.

Motor 304 is substantially similar to motor 104 (shown in FIG. 2) with the exceptions being a heat exchanger 352 coupled in flow communication with a heat exchanger inlet pipe 354 and an outlet pipe 356, a fluid passage 366 being coupled in flow communication with pipes 333 and 356, and a housing motor portion 305. Portion 305 is substantially similar to portion 105 (shown in FIGS. 1 and 2) with the exception being that coupling passage 228 in flow communication with motor outlet pipe 134 (shown in FIGS. 1 and 2) is supplanted by coupling passage 228 in flow communication with heat exchanger inlet pipe 354. Portion 305 also includes a radially outer housing surface 360.

In the exemplary embodiment, heat exchanger 352 and pipes 354 and 356 are positioned at predetermined distances from housing surface 360 to facilitate conductive heat transfer from heat exchanger 352 and pipes 354 and 356 to an environment external to housing portion 305. Alternatively, configurations for pipes 354 and 356 and heat exchanger 352 may include, but not be limited to piping 354 and 356 and heat exchanger 352 positioned in contact with housing surface 360 and /or heat exchanger 352 and pipes 354 and 356 being configured to be integral portions of housing portion 305.

Station 100 may be positioned in environments wherein external temperatures on surface 360, or the temperature of the transport fluid within fixture 108, are such that effective conductive heat transfer using the methods and apparatus of the exemplary embodiment as discussed above may not be fully facilitated. In the alternative embodiment, fluid is channeled through housing portion 305 and heat removed from stator enclosure 200 as in the exemplary embodiment and then transport fluid is channeled from passage 228 to pipe 354. Fluid channeled within pipe 354 is channeled through heat exchanger 352 wherein heat is transferred to the environment external to housing portion 305. The fluid is channeled from heat exchanger 352 through pipe 354 to passage 366 and subsequently to fan 144 for recirculation through housing portion 305.

In this alternative embodiment, initial filling of housing portion 305 and replacement of any fluid leakage from housing portion 305, for example to compressor 102 via seal 137, may be facilitated via pipe 333. For example, if the pressure within housing portion 305 decreases to a predetermined pressure, at least a portion of transport fluid within pipe 110 will flow through pipe 333 to passage 366 and enter housing portion 305 at a predetermined rate of flow and rate of pressurization.

The alternative embodiment may also facilitate mitigating the introduction of contaminants into housing portion 305. For example, the transport fluid may contain a predetermined amount of contaminants. Continuous introduction of transport fluid into housing portion 105 of the exemplary embodiment (shown in FIGS. 1 and 2) may also introduce the contaminants. As described above, subsequent to initial filling, typically only periodic makeup fluid is channeled into housing portion 305, thereby decreasing a potential for introducing contaminants into housing portion 305.

The compressing station described herein facilitates transporting natural gas through a pipeline. More specifically, the compressing station assembly includes a compressing device coupled to a permanent magnet-type super-synchronous electric motor. Permanent magnet-type super-synchronous electric motors have the advantages associated with electric induction motors, including fewer components and higher energy densities at higher speeds resulting in a smaller foot print, as well as the advantages of higher efficiency due to the capability to operate at higher speeds. As a result, the operating efficiency of compressing stations may be increased and the stations' capital and maintenance costs may be reduced.

The methods and apparatus for transporting a fluid within a pipeline described herein facilitates operation of a fluid transport station. More specifically, the motor as described above facilitates a more robust fluid transport station configuration. Such motor configuration also facilitates efficiency, reliability, and reduced maintenance costs and fluid transport station outages.

Exemplary embodiments of motors as associated with fluid transport station are described above in detail. The methods, apparatus and systems are not limited to the specific embodiments described herein nor to the specific illustrated motors and fluid transport station.

While the invention has been described in terms of various specific embodiments, those skilled in the art will recognize that the invention can be practiced with modification within the spirit and scope of the claims.

What is claimed is:

1. An electrical machine comprising:
   a stator;
   a rotor magnetically coupled to said stator
   a fluid fan assembly coupled to said rotor;
   a housing enclosing said rotor and said stator, said housing comprising a wall that facilitates channeling a first fluid through a portion of said housing; and
   a stator enclosure defined by at least one wall that facilitates maintaining a second fluid within said stator enclosure, said stator enclosure within said electric machine housing, said stator enclosure at least one wall substantially isolates the second fluid from the first fluid, such that only the second fluid is in flow communication with said stator, said stator enclosure at least one wall facilitates heat transfer from the second fluid to the first fluid, said at least one stator wall is flexible to facilitate equalizing operating pressure between the first and second fluids.

2. An electrical machine in accordance with claim 1 wherein said stator comprises a core portion and at least one end winding portion, said core portion comprising a plurality of laminations, said plurality of laminations comprising a first lamination having a first thermal conductivity and a second lamination having a second thermal conductivity that is different than the first thermal conductivity, said second lamination is in thermal communication with said stator enclosure at least one wall to facilitate heat removal from said stator core.

3. An electrical machine in accordance with claim 1 wherein said stator enclosure comprises a first end turn portion and an opposing second end turn portion coupled together in flow communication via the second fluid, thereby reducing pressure differentials between said end turn portions, the second fluid being a dielectric fluid.

4. An electrical machine in accordance with claim 1 wherein said stator enclosure at least one wall comprises a first portion and a second portion, said second portion extending from said first portion, said first portion defines a gap between said rotor and said stator, said gap enables at least a portion of the first fluid to be channeled through said housing.

5. An electrical machine in accordance with claim 4 wherein said second portion is coupled to at least one support member coupled to an end winding, said at least one support member and said second portion facilitate providing radial and axial support to said end winding.

6. An electrical machine in accordance with claim 4 wherein said second portion facilitates reducing vibrations induced to said machine during rotor operation.

7. An electrical machine in accordance with claim 4 wherein said first portion facilitates reducing magnetic losses between said rotor and said stator.

8. An electrical machine in accordance with claim 4 wherein said first portion comprises a first end and an opposite second end, said first portion and said second portion comprise a first material, said second portion is coupled to said first end, a third portion is coupled to said second end, said portions are configured to substantially isolate the first fluid from the second fluid.

9. An electrical machine in accordance with claim 1 wherein said machine further comprises a heat exchanger coupled in flow communication with said housing, said heat exchanger configured to reduce an operating temperature of the first fluid within said housing.

10. A method of operating an electrical machine, said method comprising:
    coupling a transport station including a fluid transport assembly, the fluid transport assembly comprising at least one fluid fan assembly powered by the electrical machine to a source of a first fluid, wherein the assembly and the machine are enclosed within a housing;
    channeling the first fluid from the fluid transport assembly to the electrical machine such that first fluid flows over at least a portion of a stator enclosure defined in the housing;
    transferring heat generated within the stator enclosure to the first fluid such that an operating temperature of a second fluid within the stator enclosure is facilitated to be reduced; and
    discharging the first fluid from the housing.

11. A method in accordance with claim 10 wherein channeling the first fluid comprises at least one of the following:
    channeling the first fluid using the at least one fluid fan assembly coupled to a rotor within the electrical machine; and
    channeling the first fluid using at least one pump assembly coupled to a rotor within the electrical machine.

12. A method in accordance with claim 10 wherein transferring heat generated within the stator enclosure comprises:
    transferring heat from a stator portion of the electrical machine to the stator enclosure through at least one thermally conductive stator lamination; and
    transferring heat from a stator winding portion of the electrical machine to at least a portion of the second fluid.

13. A method in accordance with claim 12 wherein transferring heat from a stator winding portion comprises at least one of the following:
    transferring heat from the stator winding portion using convective circulation; and
    transferring heat from the stator winding portion using at least one forced circulation apparatus.

14. A method in accordance with claim 10 wherein discharging the first fluid from the housing comprises channeling the first fluid through a heat exchanger.

15. A fluid transport station comprising:
    a unitary housing comprising at least one wall, said wall facilitates channeling a first fluid within said unitary housing;
    a fluid transport assembly within said unitary housing, said fluid transport assembly comprising at least one rotatable shaft, and at least one fluid fan assembly coupled to said at least one rotatable shaft; and
    a drive motor positioned within said housing, said drive motor comprising a stator with an enclosure, and a rotor, said stator enclosure and said rotor housed within said housing, said rotor magnetically coupled to said stator, said drive motor rotor rotatably coupled to said fluid transport assembly rotatable shaft, said stator enclosure defined by at least one wall that facilitates maintaining a second fluid within said stator enclosure, said stator enclosure at least one wall substantially isolates the second fluid from the first fluid, such that only the second fluid is in flow communication with said stator, said stator enclosure at least one wall facilitates heat transfer from the second fluid to the first fluid, at least a portion of said at least one wall is flexible to facilitate equalizing an operating pressure between the first and second fluids.

16. A fluid transport station in accordance with claim 15 wherein said fluid transport assembly comprises at least one of:
    a fluid compressor; and
    a fluid pump.

17. A fluid transport station in accordance with claim 15 wherein said stator comprises a core portion and at least one end winding portion, said core portion comprising a plurality of laminations, said plurality of laminations comprising a first lamination having a first thermal conductivity and a second lamination having a second thermal conductivity that is different than the first thermal conductivity, said second lamination is in thermal communication with said stator enclosure at least one wall to facilitate heat removal from said stator core.

18. A fluid transport station in accordance with claim 15 wherein said stator enclosure comprises a first end turn portion and an opposing second end turn portion coupled together in flow communication via the second fluid, thereby reducing pressure differentials between said end turn portions, the second fluid being a dielectric fluid.

19. A fluid transport station in accordance with claim 15 wherein said stator enclosure at least one wall comprises a first portion and a second portion, said second portion extending from said first portion, said first portion defines a gap between said rotor and said stator, said gap enables at least a portion of the first fluid to be channeled through said housing.

20. A fluid transport station in accordance with claim 15 wherein said station further comprises a heat exchanger coupled in flow communication with said housing, said heat exchanger configured to reduce an operating temperature of the first fluid within said housing and to mitigate introduction of contaminants into said housing.

* * * * *